No. 672,812. Patented Apr. 23, 1901.
C. B. VOYNOW.
CAR WHEEL.
(Application filed Dec. 29, 1900.)
(No Model.) 2 Sheets—Sheet 1.
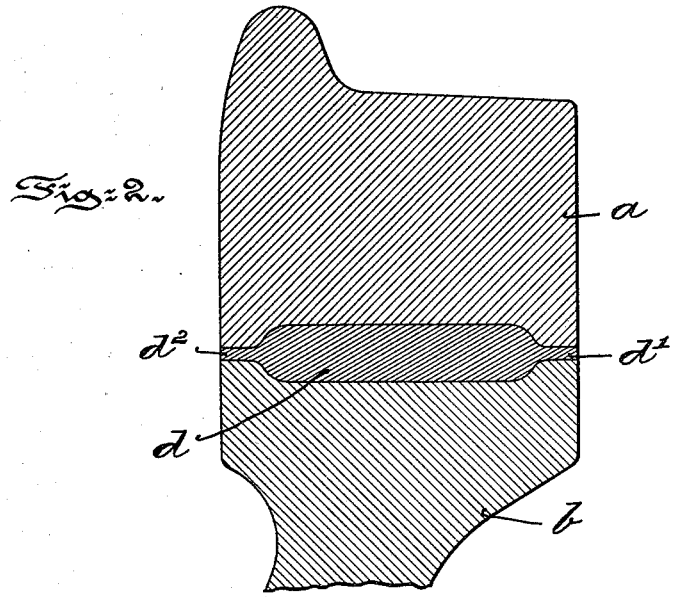
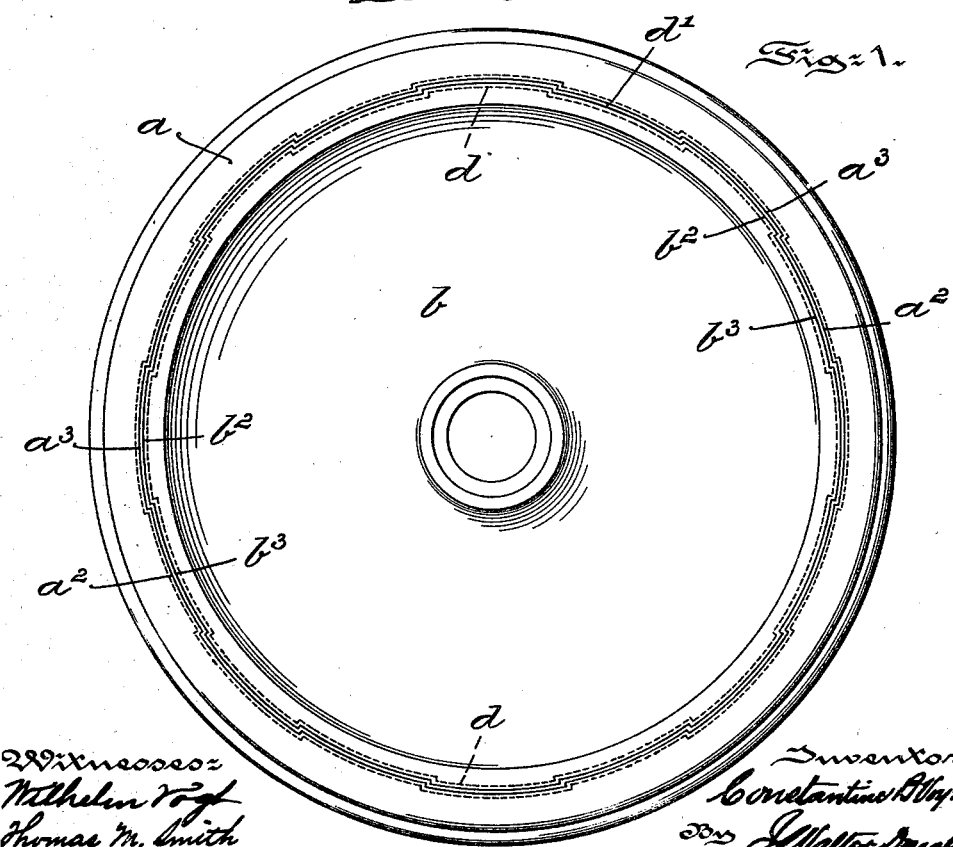

No. 672,812. Patented Apr. 23, 1901.
C. B. VOYNOW.
CAR WHEEL.
(Application filed Dec. 29, 1900.)
(No Model.) 2 Sheets—Sheet 2.
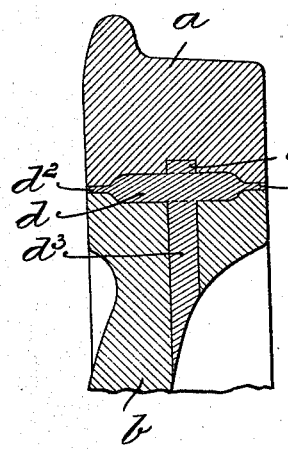
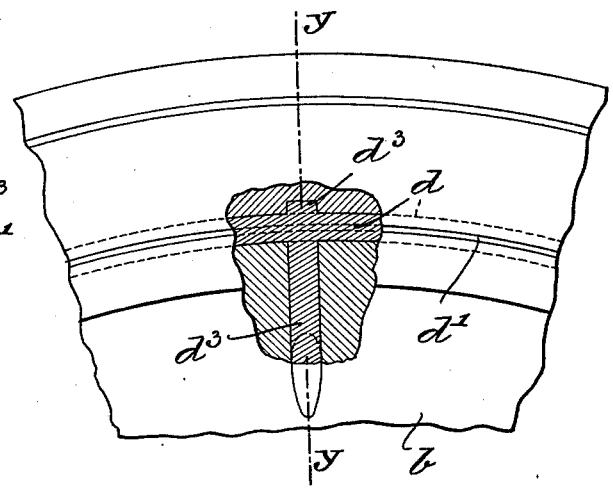
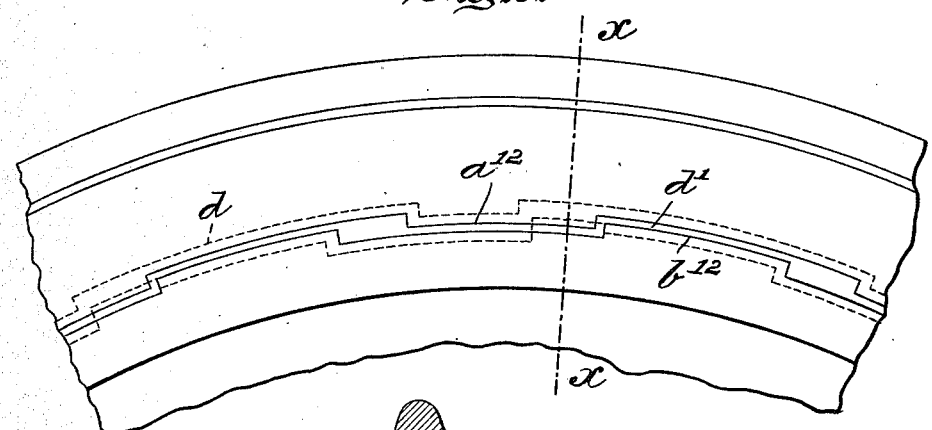
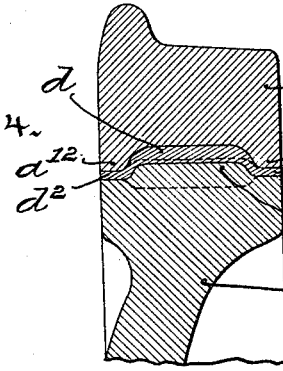

UNITED STATES PATENT OFFICE.

CONSTANTINE B. VOYNOW, OF PHILADELPHIA, PENNSYLVANIA.

CAR-WHEEL.

SPECIFICATION forming part of Letters Patent No. 672,812, dated April 23, 1901.

Application filed December 29, 1900. Serial No. 41,450. (No model.)

*To all whom it may concern:*

Be it known that I, CONSTANTINE B. VOY-NOW, a citizen of the United States, residing at the city of Philadelphia, in the county of Philadelphia and State of Pennsylvania, have invented certain new and useful Improvements in Car-Wheels, of which the following is a specification.

My invention has relation to a car-wheel of the type or class wherein the rim or tire and the body of the wheel are separately formed of two different or the same metals and afterward assembled together, and in such connection it relates to the construction and arrangement of such a car-wheel.

The principal objects of my invention are, first, to provide a car-wheel in which the tire or rim can be readily applied and secured to or removed from the body or core of the wheel, as requirements demand; second, to provide a car-wheel in which the tire or rim is held in position on the body or core by means of a suitable material introduced or placed between the rim or tire and the body or core, and, third, to provide a car-wheel in which the tire or rim and the body or core are so arranged that when assembled a space is provided between the body or core and the rim or tire adapted for the reception and retention of a suitable material to form a bed or filler, which is maintained in said space by the configuration or shape of the space.

The nature and scope of my invention will be more fully understood from the following description, taken in connection with the accompanying drawings, forming part hereof, in which—

Figure 1 is a side elevational view of a car-wheel embodying my invention. Fig. 2 is an enlarged vertical central sectional view of the tire or rim and of a portion of the body or core of the wheel. Fig. 3 is an enlarged side elevational view of a portion of the tire or rim and body or core of a wheel embodying a modified form of the invention. Fig. 4 is a cross-sectional view on the line $x\ x$ of Fig. 3. Fig. 5 is an enlarged side elevational view of a portion of a car-wheel embodying a still further modified form of my invention, and Fig. 6 is a cross-sectional view on the line $y\ y$ of Fig. 5.

Referring to the drawings, $a$ represents the rim or tire of the wheel, and $b$ the body or core thereof. In Figs. 1 and 2 the rim or tire $a$ at its inner periphery is preferably of slightly-greater diameter than the outer periphery of the body or core $b$. The inner periphery of the tire $a$ is step-shaped—that is, it alternately projects outward and inward, as at $a^2$ and $a^3$, respectively—while the body $b$ is correspondingly shaped, as at $b^2$ and $b^3$; but the projections and indentations are reversely arranged, so that an outer projection $a^2$ of the tire or rim is arranged opposite to an inner projection or indentation $b^3$ of the body or core. The inner periphery of the rim or tire $a$ and the outer periphery of the body or core $b$ are also peripherally grooved, the grooves being complementally arranged to form a relatively wide substantially annular space between the faces of the wheel, and this wide space communicates with the smaller substantially annular spaces at either face of the wheel, which smaller spaces result from making the inner diameter of the rim or tire $a$ greater than the diameter of the body or core $b$. The wide space and the smaller spaces are adapted to be filled by a bed or filler of suitable material—such as zinc, type-metal, sulfur, or the like—so that there will be confined between the rim or tire and the body or core a relatively large band $d$ of the bed or filler, narrowing down at either face into a relatively small band $d'$ or $d^2$ of said bed or filler. The projections $a^2\ a^3$ and $b^2\ b^3$ and the correspondingly-shaped bands of filler serve to prevent the turning of the rim or tire on the body or core of the wheel under tractile strain. The bed or filler also serves to interlock the rim or tire $a$ and body or core $b$ to prevent separation under torsional strain or side thrust.

In Figs. 3 and 4 the construction is somewhat modified by making the outer projections $b^{12}$ of the body or core $b$ of a width or thickness in cross-section slightly less than the width or thickness of the channel or space in the inwardly-projecting portions $a^{12}$ of the rim or tire, thus permitting the body or core $b$ to be first arranged so that the steps of the body or core enter the indentations of the rim or tire and then to be turned so that said projections $b^{12}$ may partially enter the channel or space of the projections $a^{12}$ of the rim or tire, as clearly illustrated in Fig. 4.

In Figs. 5 and 6, instead of interlocking the rim or tire and the body or core by means of the step-like complemental portions $a^2$ and $a^3$ and $b^2$ and $b^3$, the channeled portions are annular, and at intervals radial channels are drilled through the body and into the rim or tire, so that when the bed or filler enters the channels or spaces it fills up these channels or spaces and forms plugs or keys $d^3$, of metal, which prevent the separation of the rim or tire from the body or core under tractile strain or side thrust. A material or materials may be used as a bed or filler, which is or are susceptible of wholly or partially assimilating or combining with the material or materials of the rim or tire and body or core of the wheel, so as to make, as it were, an integral wheel, but at the same time capable under treatment, such as fusion or otherwise, to cause the assimilating or combining element of the wheel to be readily separable to part the tire or rim from the body or core of the wheel.

It is manifestly obvious that modifications as to details may be made in both the shape or form of the rim or tire and body or core in so far as such a wheel has been illustrated in the drawings of my invention without departing from the scope of the same, and hence I do not wish to be understood as confining myself to the precise construction and arrangement of the tire or rim and body or core as hereinbefore described and illustrated; but,

Having thus described the nature and objects of my invention, what I claim as new, and desire to secure by Letters Patent, is—

1. A car-wheel, comprising a rim or tire, a body or core and a bed or filler introduced between and completely separating contiguous surfaces of said rim or tire and body or core, said bed or filler consisting of a material of a lower melting-point than either the metal of said rim or tire or of the body or core, and said bed or filler neither fusing nor welding with said rim or tire or body or core.

2. A car-wheel, comprising a rim or tire provided with an inner space or groove, a body or core provided with an outer groove or space and a bed or filler adapted to be introduced between and completely separating the contiguous surfaces of the grooved portions of the rim or tire and body or core and filling the groove thus formed, said bed or filler consisting of a material of a lower fusing-point than either the metal of the rim or tire or of the body or core, and said bed or filler neither fusing nor welding with said rim or tire or body or core.

3. A car-wheel, comprising a rim or tire, a body or core, the diameter of which is less than the inner diameter of the rim or tire and a bed or filler adapted to be introduced between and completely separating the contiguous surfaces of the rim or tire and body or core of the wheel, said bed or filler consisting of a material of a lower fusing-point than either the metal of the rim or tire or of the body or core and said bed or filler neither fusing nor welding with said rim or tire or body or core.

4. A car-wheel, comprising a rim or tire, the inner periphery of which is channeled or grooved, a body or core, the periphery whereof is channeled or grooved complementally to the rim or tire, the diameter of said body or core being less than the inner diameter of the rim or tire, and a bed or filler interposed between and completely separating the contiguous peripheries of the rim or tire and body or core and confined in the space formed by the complemental channels or grooves of said rim or tire and body or core, the said bed or filler consisting of a material of a lower fusing-point than the metal of said rim or tire and body or core and said bed or filler neither fusing nor welding with said rim or tire or body or core.

5. A car-wheel, comprising a rim or tire, a body or core, the diameter of which is less than the inner diameter of said rim or tire, a bed or filler confined between and completely separating the contiguous peripheries of the rim or tire and body or core of the wheel, said bed or filler consisting of a material of a lower fusing-point than the metal of said rim or tire and body or core and said bed or filler neither fusing nor welding with said rim or tire or body or core, and means for interlocking said rim or tire, the body or core and bed or filler to prevent slipping of the rim or tire on said body or core under tractile strain or side thrust.

In testimony whereof I have hereunto set my signature in the presence of two subscribing witnesses.

CONSTANTINE B. VOYNOW.

Witnesses:
J. WALTER DOUGLASS,
THOMAS M. SMITH.